United States Patent [19]

Norrmén

[11] Patent Number: 4,810,327
[45] Date of Patent: Mar. 7, 1989

[54] FALLING FILM EVAPORATOR OF THE VERTICAL-TUBE TYPE

[75] Inventor: Kjell Norrmén, Bålsta, Sweden

[73] Assignee: Ahlströmföretagen Svenska AB, Norrköping, Sweden

[21] Appl. No.: 724,721

[22] Filed: Apr. 18, 1985

[30] Foreign Application Priority Data

Apr. 24, 1984 [SE] Sweden ................ 8402229

[51] Int. Cl.⁴ .................. B01D 3/04; B01D 1/22
[52] U.S. Cl. ................ 159/13.3; 159/13.4; 159/27.1; 159/43.1; 159/49; 202/236; 202/237; 202/266; 202/268; 203/89; 165/118; 165/162; 165/163
[58] Field of Search ........... 159/13.3, 27.4, 49, 159/43.1, 13.4, 27.1; 203/89; 202/236, 237, 266, 268; 165/113, 115, 118, 163, 162; 122/32

[56] References Cited

U.S. PATENT DOCUMENTS

| | | | |
|---|---|---|---|
| 1,694,370 | 12/1928 | Burdick | 165/118 |
| 1,717,927 | 6/1929 | Hughes et al. | 159/13.2 |
| 2,349,657 | 5/1944 | Heimelin | 159/13.3 |
| 3,356,125 | 12/1967 | Standiford | 159/49 |
| 4,422,899 | 12/1983 | Juhola et al. | 159/49 |
| 4,427,053 | 1/1984 | Klaren | 159/14 |
| 4,450,902 | 5/1984 | Bosne | 165/162 |
| 4,450,904 | 5/1984 | Volz | 165/163 |
| 4,520,866 | 6/1985 | Nakajima et al. | 165/115 |

FOREIGN PATENT DOCUMENTS

| | | | |
|---|---|---|---|
| 2606315 | 8/1976 | Fed. Rep. of Germany | 159/13.3 |
| 2541399 | 3/1977 | Fed. Rep. of Germany | 165/162 |
| 1596365 | 12/1967 | France | 159/13.3 |
| 0392948 | 1/1969 | U.S.S.R. | 159/13.3 |
| 1039514 | 9/1983 | U.S.S.R. | 159/27.4 |
| 1196493 | 1/1967 | United Kingdom | |
| 1244769 | 2/1971 | United Kingdom | |
| 1532100 | 11/1978 | United Kingdom | 165/162 |

Primary Examiner—Kenneth M. Schor
Assistant Examiner—V. Manoharan
Attorney, Agent, or Firm—Toren, McGeady & Associates

[57] ABSTRACT

In a falling film evaporator of the vertical-tube type in which liquid to be evaporated is supplied at the top on the outer surface of vertical heat exchanger tubes and the heat medium is supplied to the heat exchanger tubes at the bottom for flow inside the same, at least one larger tube element than the heat exchanger tubes is disposed between and fixed to tube plates at the both ends of the group of tubes to stabilize the group of tubes against tension and especially compression stresses. The larger stabilizing tube element is at its upper end connected with an inlet passage for the primary vapor passing through a steam dome communicating with the upper ends of the tubes and adapted to serve as a transportation channel for directing the primary vapor down through the group of tubes to a chamber formed under the lower tube plate and communicating with the lower, open ends of the heat exchanger tubes which chamber also forms a distributor for supplying the primary vapor to the heat exchanger tubes from underneath and a separator for particles possibly following with the primary vapor which particles are removed together with the primary condensate flowing out of the lower ends of the heat exchanger tubes from the bottom of the said chamber. The group of tubes in the housing is supported by the said upper tube plate and is hanging freely down from it.

6 Claims, 1 Drawing Sheet

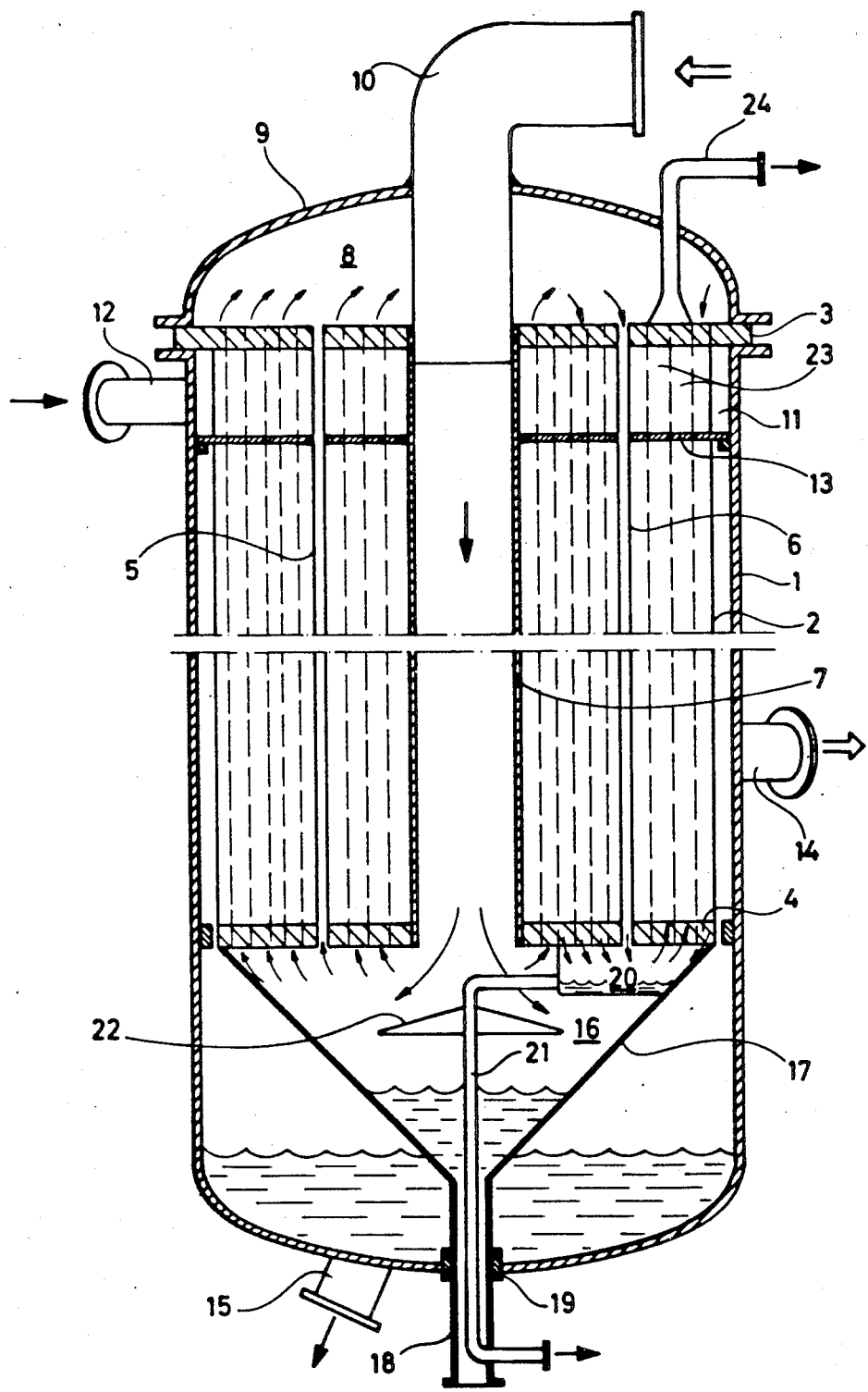

FALLING FILM EVAPORATOR OF THE VERTICAL-TUBE TYPE

The subject of the present invention is a vertical-tube type falling film evaporator in which the liquid to be evaporated is supplied from above on the outer surface of the vertical heat exchanger tubes and the heat medium is supplied to the heat exchanger tubes from below to flow inside the same.

This type of falling film evaporator with a falling film on the outer surface of the tubes is chosen due to the advantages in the so called vapor conversion where the heat content of a polluted process vapor is recovered by generating a purer secondary vapor for various applications. Removing deposits emanating from the polluted process vapor from the evaporator is simplified if they are on the inside of the tubes, while cleaning various evaporator spaces outside the tubes is considerably more difficult.

The tendency to form deposits can further be reduced and the running periods between each cleaning lengthened by supplying the process vapor to the tubes from underneath. The effect is explained by the fact that the condensate flowing out of the lower ends of the tubes and the condensate formed in the tubes meets the inflowing primary vapor and can directly separate extensive amounts of e.g. pollution particles from the primary vapor.

In a falling film evaporator of the present type long, e.g. 3–6 meter, groups of tubes of the thinnest possible wall thickness are desirable in order to reach the highest possible heat exchange with the lowest possible tube costs. However, because thin tubes usually cannot resist the tension and especially compression stresses that result from the vapor pressure on both sides of the tube plates, some sort of additional support for the group of tubes exceeding a certain length is required. In the falling film evaporator of the above mentioned type, described in the U.S. Pat. No. 4,422,899, this support is accomplished by means of baffle-elements disposed at certain levels along the group of tubes. This again creates disturbances in the liquid film falling along the tubes due to which the baffle-elements have to be designed as redistributor elements for the falling film. Besides the costs of the baffle and distributor means this design causes recurrent breaking and starting of the falling liquid, which causes less heat transfer along those lengths where the liquid film flows at a low speed.

The wish to supply the primary vapor to the group of tubes from underneath involves an additional design problem in that a certain mobility of the group of tubes is always required as regards to at least a part of the surrounding housing. In case the vapor inlet, as shown in the U.S. Pat. No. 4,422,899, is fixed to the lower part of the housing, axial compensators are required in the housing. Alternatively the primary vapor inlet can be flexible between the housing and the group of tubes by means of a bellows device.

The object of the present invention is to accomplish a falling film evaporator of the previously mentioned type in which long, undisturbed stretches of falling film on the outer surfaces of the heat exchanger tubes are possible.

One further object of the invention is to accomplish an evaporator of the vertical-tube type in which the primary vapor is supplied to the group of tubes from underneath to minimize the risk of soiling or clogging the evaporator due to polluting components in the primary vapor and at the same time to eliminate the demand for bellow devices or the axial compensator.

According to the invention a falling film evaporator of the vertical-tube type has been accomplished which meets the above mentioned aims and which has a simple and advantageous design as regards the costs. The evaporator according to the invention comprises at least one tube element larger than the vaporizing heat exchange tubes which tube element extends between and is fitted to the tube plates in order to stabilize the group of tubes against tension and in particular compression stresses, and which larger tube element at its upper end is connected to a inlet passage for primary vapor passing through the steam dome and adapted to serve as a transportation channel to lead the primary vapor down through the group of tubes to a chamber disposed under the lower tube plate and communicating with the lower, open ends of the heat exchanger tubes, which chamber functions simultaneously as a distributor for supplying the heat exchanger tubes with primary vapor from underneath and as a separator for removal of possible polluting particles from the primary vapor which particles together with the primary condensate flowing out of the lower ends of the heat exchanger tubes are removed from the bottom of said chamber.

According to a preferred embodiment of the invention the group of tubes consists of thin heat exchanger tubes which form continuous falling film surfaces exceeding 3 m that are totally free from contact with baffle or other support elements. The larger tube element which supports the group of tubes and functions as a transportation channel for supply the primary vapor down through the group of tubes, consists of a central, cylindrical tube extending between both tube plates. Besides effectively solving two totally different problems with simpler means than previously needed to solve one of the problems separately, the invention has additional advantages. For instance in a preferred application in the pulp industry where process vapor polluted by e.g. fibres from so called thermomechanical pulp processing is used for generating pure secondary vapor in a vapor converter, the transport and stabilizing tube can also serve as a mixing zone for moistening of fibres taken along by the primary vapor by means of injecting e.g. secondary condensate into the inlet passage for the primary vapor. The fibre separating effect on the primary vapor before it passes into the heat exchanger tubes consists thereby partly of the downwards directed movement component received by the moistened pulp fibres through the central tube of the group of tubes and partly of the said cleaning in counter-flow by means of the primary condensate flowing out of the lower ends of the tubes.

A specific characteristic of the device according to the invention is that the group of tubes is suspended freely in the evaporator housing which again simplifies the design by eliminating the demand for compensators and bellow devices and by facilitating the access to the group of tubes for cleaning and reparation purposes. Tubes which have been contaminated during the operation of the apparatus can thus easily be cleaned on their inside and outside.

The group of tubes in the evaporator according to the invention can be arranged as both a single and a double passage for the primary vapor. In the latter case the primary vapor is led upwards through the first group of tubes and then downwards through the second group of tubes. In the case of the single passage the primary vapor is taken directly from the vapor space above the upper tube plate via a vapor outlet passing through the evaporator cover or the steam dome. In the case of the double passage the vapor outlet for the primary vapor can according to a specially preferred embodiment of the invention be arranged from the vapor space above the group of tubes by providing tube passages, consisting of a small amount of heat exchanger tubes, to direct the uncondensed primary vapor up through the group of tubes from a separate distributor and condensate chamber that has to be disposed in connection with the lower ends of the tubes of that group of heat exchanger tubes that is provided for vapor flow from above downwards. There remains only one relatively small tube leading from the freely hanging group of tubes which has to be disposed flexibly in relation to the evaporator housing, i.e. the outlet tube for the primary condensate with possible particles.

BRIEF DESCRIPTION OF THE DRAWINGS

An embodiment of the invention will be described in detail with reference to the accompanying drawing showing a vertical across section of a falling film evaporator a double passage design for the primary vapor.

A group of tubes 2 is suspended freely from its upper tube plate 3 in a evaporator housing 1. Between the upper tube plate 3 and a lower tube plate 4 a plurality of heat exchanger tubes are extended divided into a first group 5 and a second group 6 together with a central larger stabilizing and vapor inlet tube 7. Above the tube plate 3 is disposed a vapor space 8 communicating with the upper, open ends of the tubes and bordering on an evaporator cover 9. An inlet pipe 10 for the primary vapor passes through the cover 9 which telescopes into the central tube 7.

For the transportation and distribution of the liquid to be evaporated there is disposed an inlet chamber 11 below the upper tube plate 3 which chamber is provided with an inlet 12 for liquid through the wall of a housing 1 and a distributor plate 13 in which openings for the distribution of a falling film along each heat exchanger tube 5, 6 are provided. The evaporated liquid generated in the heat exchanger is removed from the housing 1 via a first outlet 14 while the non-evaporated liquid is accumulated on the bottom of the housing 1 and is removed via a second outlet 15 from where the liquid can be recirculated to the inlet 12 via a pipe not shown. The evaporator comprises further a chamber 16 formed under the lower tube plate 4 which serves as a distributor for supplying the primary vapor to the group of tubes 5, as an accumulating space for the condensate from the group of tubes 5 and as a separator for removal of particles from the primary vapor. To facilitate the separation and removal of solids from the condensate the chamber 16 has been designed funnel-shaped by means of a conical boundary wall 17 which at the bottom issues into a first discharge pipe 18 for the condensate and possible polluting particles. The discharge pipe 18 is arranged to run through the bottom of the housing 1 slidingly by means of a stuffing-box 19.

In order to accomplish a downwards flow through the group of tubes 6 of the primary vapor that already has passed upwards through the group of tubes 5 there is disposed a separate distributor and condensate chamber 20 under the lower tube plate 4 in connection with tubes in the group of tubes 6. A second discharge pipe from the separate chamber 20 21 for the condensate from the group of tubes 6 runs through the discharge pipe 18 wherefore no separate stuffing-box arrangement for the discharge pipe 21 is required. A conical distributor plate 22 is located centrally in the chamber 16 fixed to the discharge pipe 21 and is primarily meant for distribution of any particles which may be in the primary vapor flowing downwards through the central tube of the group of tubes. In order to remove uncondensed primary vapor remaining after the passage through the group of tubes 6, a smaller number of heat exchanger tubes 23 is utilized, the upper ends of which in the upper tube plate 3 are connected with a third outlet 24 running through the evaporator cover 9. In the evaporator design shown in the drawing both the inlet 10 and the outlet 24 for the uncondensed primary vapor are thus connected directly with the group of tubes 2 via the upper vapor space 8 without a passage through the housing 1 in which the group of tubes 2 is freely hanging and the discharge pipe 18 slidingly passes through the bottom of the housing 1.

We claim:
1. A falling film evaporator comprising:
a housing having a bottom wall, side walls and provided at its upper end with a cover;
first and second groups of vertically arranged heat exchanger tubes mounted within said housing, each tube having open upper and lower ends;
upper and lower tube plates fitted to said heat exchanger tubes, said upper tube plate being secured to the housing and said lower tube plate being free of any connection to the housing;
a vapor inlet tube centrally disposed within the housing between the first and second groups of tubes and secured to the upper and lower tube plates, said vapor inlet tube connected at its upper end to a vapor inlet pipe while its lower end opens into a first lower chamber in communication with the open lower ends of at least the first group of heat exchanger tubes;
an upper vapor chamber located between the upper tube plate and the housing cover, said chamber in communication with the open upper ends of the first group of heat exchanger tubes and at least some of the second group of heat exchanger tubes; and
a first condensed vapor discharge pipe;
wherein, in use, vapor admitted through the inlet pipe is caused to flow downwardly through the inlet tube into the lower chamber, upwardly through at least the first group of heat exchanger tubes in the upper vapor chamber and then downwardly through at least some of the second group of heat exchanger tubes, condensed vapor generated by the passage of the vapor through the heat exchanger tubes passing out of the housing through the condensed vapor discharge pipe;
the falling film evaporator further comprising:
a first liquid inlet in the housing wall for passing liquid to be evaporated into a liquid distribution chamber located beneath the upper tube plate, the distribution chamber causing the liquid to be distributed as a falling film along exterior surface so the first and second group of heat exchanger tubes where it is evaporated as it passes in heat exchanger relationship with the vapor within the heat exchange tubes and a first outlet for removing the evaporated liquid from the housing.

2. A falling film evaporator as defined in claim 1 and further comprising:

a second outlet in the bottom wall of the housing for removing any non-evaporated liquid remaining after its passage as a falling film along the exterior surfaces of the heat exchanger tubes; and a third outlet for removing any non-condensed vapor remaining after passage through the heat exchanger tubes.

3. A falling film evaporator as defined in claim 1 and wherein:

said lower chamber is defined by a conical boundary wall connected at an upper end to the lower tube plate and at a lower end to the first condensed vapor discharge pipe.

4. The falling film according to claim 2 wherein at least some of the second group of heat exchanger tubes are connected at their open lower ends to a second lower condensate and distributor chamber separated from said first lower chamber so that the vapor already passed upwardly through the first group of tubes and downwardly through at least some of the second group of tubes passes into the condensate and distributor chamber and upwardly through other of the second group of tubes to said third outlet which channel passes through said housing cover.

5. The falling film evaporator as defined in claim 4 wherein said second lower condensate and distributor chamber is provided with a second condensed vapor discharge pipe.

6. The falling evaporator as defined in claim 1 wherein the heat exchanger tubes of the first and second groups are at least 3 meters in length.

* * * * *